(12) United States Patent
Marivoet et al.

(10) Patent No.: US 8,725,789 B2
(45) Date of Patent: May 13, 2014

(54) METHOD AND APPARATUS FOR PROCESSING DISTRIBUTED DATA

(75) Inventors: Kim Marivoet, Lovenjoel (BE); Geert Denys, Antwerp (BE)

(73) Assignee: EMC Corporation, Hopkinton, MA (US)

( * ) Notice: Subject to any disclaimer, the term of this patent is extended or adjusted under 35 U.S.C. 154(b) by 57 days.

(21) Appl. No.: 13/146,342

(22) PCT Filed: Jan. 29, 2009

(86) PCT No.: PCT/US2009/000567
§ 371 (c)(1),
(2), (4) Date: Sep. 21, 2011

(87) PCT Pub. No.: WO2010/087793
PCT Pub. Date: Aug. 5, 2010

(65) Prior Publication Data
US 2012/0005253 A1   Jan. 5, 2012

(51) Int. Cl.
*G06F 15/16* (2006.01)
(52) U.S. Cl.
USPC .......................................................... 709/201

(58) Field of Classification Search
USPC ......................................................... 709/201
See application file for complete search history.

(56) References Cited

U.S. PATENT DOCUMENTS

| | | | |
|---|---|---|---|
| 6,606,638 B1 * | 8/2003 | Tarin | 1/1 |
| 2002/0174296 A1 * | 11/2002 | Ulrich et al. | 711/114 |
| 2006/0271731 A1 * | 11/2006 | Kilian et al. | 711/108 |
| 2007/0174662 A1 * | 7/2007 | Zelikov et al. | 714/5 |
| 2008/0301256 A1 | 12/2008 | McWilliams et al. | |

OTHER PUBLICATIONS

International Search Report and Written Opinion for International Application No. PCT/US2009/000567 mailed Mar. 23, 2009.

* cited by examiner

*Primary Examiner* — Kevin Bates
*Assistant Examiner* — S M Rahman
(74) *Attorney, Agent, or Firm* — Krishnendu Gupta; Robert Kevin Perkins; Joseph D'Angelo

(57) ABSTRACT

Some embodiments are directed to processing content units stored on a distributed computer system that comprises a plurality of independent nodes. The content units may be processed by determining which content units are stored on each node and identifying which content units warrant processing. Nodes may be selected to process the content units that warrant processing and instructions may be sent to these nodes to instruct them to process these content units.

20 Claims, 5 Drawing Sheets

METHOD AND APPARATUS FOR PROCESSING DISTRIBUTED DATA

RELATED APPLICATIONS

This application is a United States national phase application under 35 U.S.C. §371 of International Application No. PCT/US2009/000567 filed Jan. 29, 2009 and entitled "Method And Apparatus For Processing Distributed Data," the entire contents of which is incorporated herein by reference.

BACKGROUND OF INVENTION

1. Field of Invention

The techniques described herein are directed generally to the field of distributed computer systems, and more particularly to techniques for processing data that is stored in a distributed computer system.

2. Description of the Related Art

A distributed computer system is a collection of two or more computers that are coupled together and are able to coordinate their activities to share data and processing tasks. Each computer in the distributed system is referred to as a node and has its own processing and storage resources.

In some distributed computer systems, the users of the distributed computer system perceive a single integrated computing facility, even though this computing facility may actually comprise multiple separate computers in disparate geographic locations.

SUMMARY

One embodiment is directed to a method of processing content units in a distributed computer system comprising a plurality of nodes coupled by at least one communication medium, wherein each of the plurality of nodes comprises at least one independent computer that has hardware processing and storage resources separate from those of any other of the plurality of nodes, wherein each of the independent nodes stores a plurality of content units, wherein the plurality of nodes comprises at least a first node and a second node, and wherein the method comprises acts of: (A) generating, on each of the first and second nodes, a list of identifiers of content units stored on that node; (B) dividing each of the lists generated in the act (A) into a plurality of sub-lists, wherein each sub-list includes a particular range of identifiers; (C) sending, from the first node to the second node, the sub-list generated in the act (B) that includes the range of identifiers that is assigned to the second node and sending, from the second node to the first node, the sub-list generated in the act (B) that includes the range of identifiers that is assigned to the first node; (D) receiving, at the first node, the sub-list from the second node and combining the sub-list from the second node with at least one other sub-list generated in the act (B) to generate a first combined list, and receiving, at the second node, the sub-list from the first node and combing the sub-list from the first node with at least one other sub-list generated in the act (B) to generate a second combined list; (E) identifying, at the first node, whether any content units identified in the first combined list warrant processing and identifying, at the second node, whether any content units identified in the second combined list warrant processing; and (F) when it is determined in the act (E) that at least one content unit identified in the first combined list warrants processing: (F1) selecting at least one of the plurality of nodes to perform the processing for the at least one content unit identified as warranting processing; and (F2) sending at least one instruction, from the first node to the at least one of the plurality of nodes selected in the act (F1), to process the at least one content unit identified in the act (E) as warranting processing. Another embodiment is directed to at least one computer readable storage medium encoded with instructions that, when executed on the distributed computer system, perform the above-described method.

A further embodiment is directed to a distributed computer system comprising: a plurality of nodes coupled by at least one communication medium, wherein each of the plurality of nodes is an independent computer having separate hardware processing and storage resources, wherein each of the independent nodes stores a plurality of content units, and wherein at least one of the plurality of nodes comprises at least one controller that: generates a list of identifiers of content units stored on the node; divides each list of identifiers into a plurality of sub-lists, wherein each sub-list includes a particular range of identifiers; sends at least some of the sub-lists to other nodes in the distributed computer system that are assigned to receive the range of identifiers in those sub-lists; receives at least one sub-list from at least one other node and combines the at least one sub-lists with a sub-list from the list of identifiers to generate a combined list; identifies whether any content units identified in the combined list warrant processing; selects at least one node to perform the processing for each of the content units identified as warranting processing; and sends at least one instruction to each of the at least one selected nodes to process the content units selected to be processed by that node.

DETAILED DESCRIPTION

Applicants have appreciated that in a distributed computer system there are many situations in which it may be useful to determine what data is stored on each node in the distributed computing system so that particular data items may be identified as warranting processing, and so that data items that warrant processing may be processed in a distributed way.

For example, a distributed computer system may store content units in such a way that some or all of the content units are distributed across the nodes of the distributed computer system for data protection purposes. That is, for example, a content unit may be fragmented into multiple fragments and parity information may be computed for the fragments, such that if one or more of the fragments is lost, the lost fragment(s) may be regenerated using the remaining fragments and the parity information. Alternatively, rather than fragmenting a content unit, the entire content unit may be stored on a single node, and a mirror copy of the content unit may be stored on a different node. If a node in the distributed system or a storage device within such a node fails, it may be desirable to determine which content units or fragments of content units are stored on the remaining nodes so that content unit fragments or content units that were lost as a result of the failure may be identified.

Another example of a situation in which it may be useful to determine which content units are stored on each node is if it is desired to determine if there are redundant content units or fragments of content units stored in the distributed system that are available to be deleted. For example, if a node or a storage device within a node fails, content units or fragments that were stored on the failed node or storage device may be regenerated. If the failed node or storage device later comes back online, it may be desired to identify the unneeded content units or fragments and delete them.

Applicants have appreciated that there are many other situations that may arise in which it may be useful to determine what content units are stored on each node in a distributed computing system so that particular content units may be identified as warranting processing, and so that the content units that warrant processing may be processed in a distributed way.

Thus, some embodiments are directed to a process for identifying which content units are stored on each node of a distributed system, determine what processing, if any, of those content units is warranted, and distribute processing of those content units across the nodes of the distributed computing system.

Figure 1:
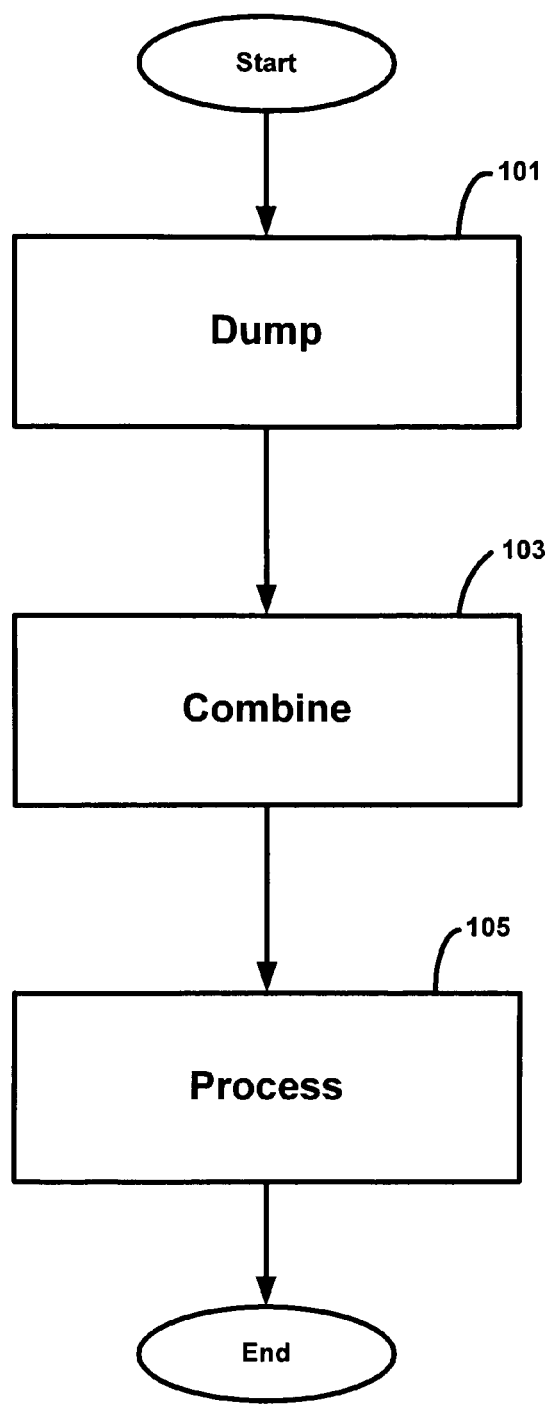
FIG. 1 is a flow chart of an illustrative process for processing content units stored in a distributed storage system, in accordance with some embodiments of the invention.

One example of such a process is shown in FIG. 1. The process of FIG. 1 begins with the dump phase, at act 101, where each node in the distributed system creates a list of content units stored thereon. This may be done in any suitable way, as the invention is not limited in this respect. For example, in some embodiments, the content units stored on each node may be stored in a file system on the node, and a request may be sent to the file system to list all of the content units stored therein.

The process then continues to the combine phase, at act 103, in which each node in the distributed system sends the portion of the lists of content units stored thereon to the other nodes in the distributed system that are responsible for those portions. For example, in some embodiments, each content unit may have an identifier that uniquely identifies it in the distributed computing system. A portion of the range of identifiers may be assigned to each node. For example, in a distributed system having three nodes, identifiers beginning with 'A'-'H' may be assigned to node 1, identifiers beginning with 'I'-'P' may be assigned to node 2, and identifiers beginning with 'Q'-'Z' may be assigned to node 3. Thus, in the example above, node 1 would divide the list of content units stored thereon into three lists corresponding to the three ranges of content units, and would send the portion of the list having identifiers beginning with 'I'-'P' to node 2, and the portion of the list having identifiers beginning with 'Q'-'Z' to node 3.

The process then continues to the process phase, at act 105, in which nodes process the content units identified as warranting further processing.

The process shown in FIG. 1 may be implemented on any suitable distributed system. One example of a distributed system on which this process may be implemented is shown in FIG. 2.

Figure 2:
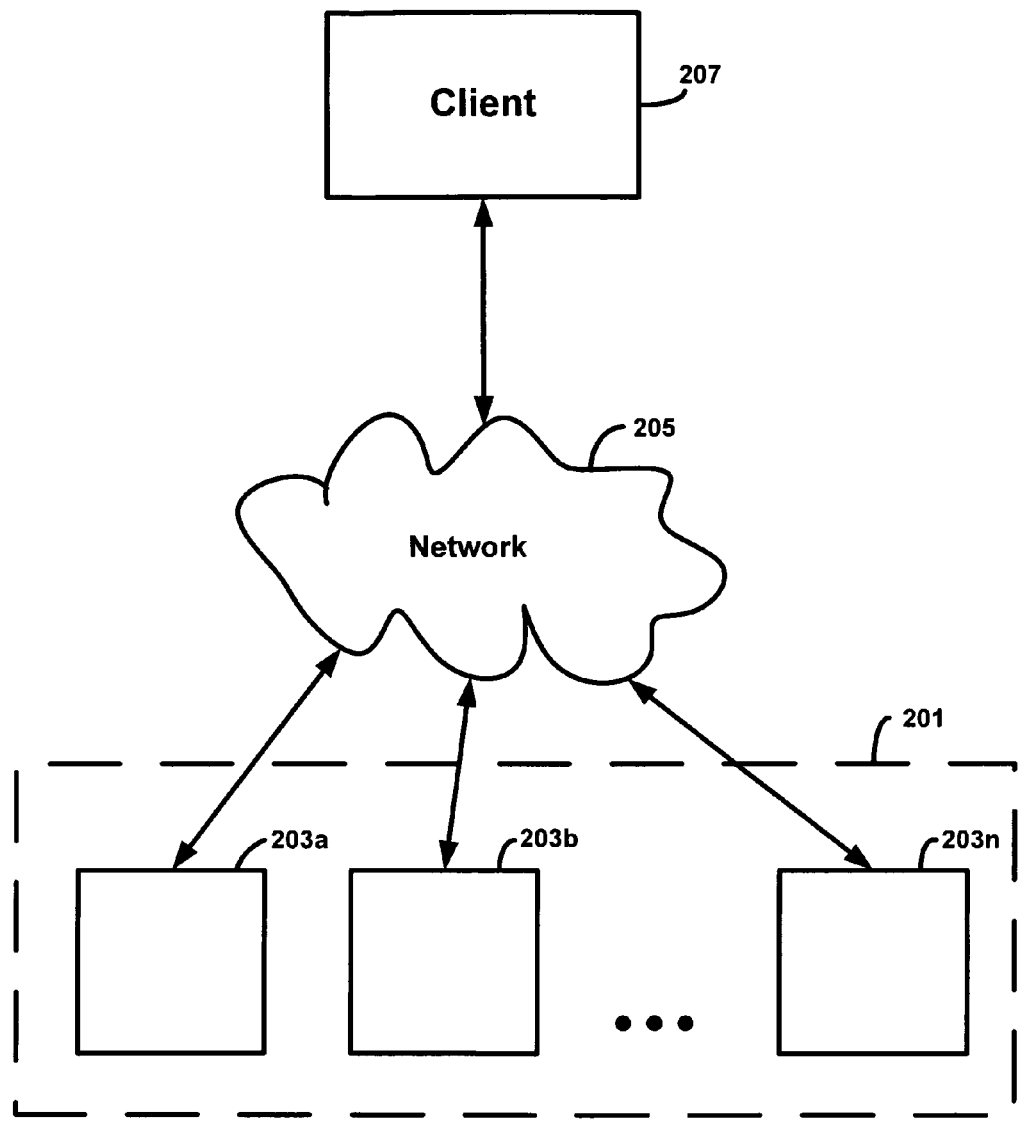
FIG. 2 is a block diagram of a distributed computer system having a plurality of independent nodes, upon which the process of FIG. 1 may be implemented.

In FIG. 2, distributed computer system 201 comprises a plurality of independent nodes 203*a*, 203*b*, . . . , 203*n*. Distributed computer system 201 may have any suitable number of nodes, as the invention is not limited in this respect. Each of nodes 203 is an independent computer having its own processing and storage resources. Nodes 203 may communicate with each other via network 205 to coordinate their activities and share data and processing tasks. Client 207 may send and receive data access and processing requests to distributed computer system 201. From the perspective of client 207, distributed system 201 appears to be a single unified computer system, as the client is unaware that the system comprises a plurality of independent nodes.

For the sake of simplicity, FIG. 2 shows a single client computer accessing the distributed system. However, it should be appreciated that the distributed computer system may process access requests from any number of client computers, and is not limited to use with a single client computer.

In some embodiments, the distributed system may be an object addressable storage (OAS) system. In an OAS system, content units stored thereon are identified by object identifiers that, from the perspective of clients storing and retrieving content units on the OAS system, are independent of any physical and/or logical storage location of the content units that they identify. Thus, each node of the distributed system may identify a content unit using its object identifier.

One type of OAS system that may be used in some embodiments is a content addressable storage (CAS) system. In a CAS system, the object identifier for a content unit is a content address. A content address is a particular type of object identifier that is generated, at least in part, using at least a portion of the content of the content unit that it identifies. For example, one type of content address that may be used in some embodiments may be generated by hashing all or a portion of the content of a content unit using a hash function, and using the resulting hash value as all or a portion of the content address for the content unit.

Figure 3:
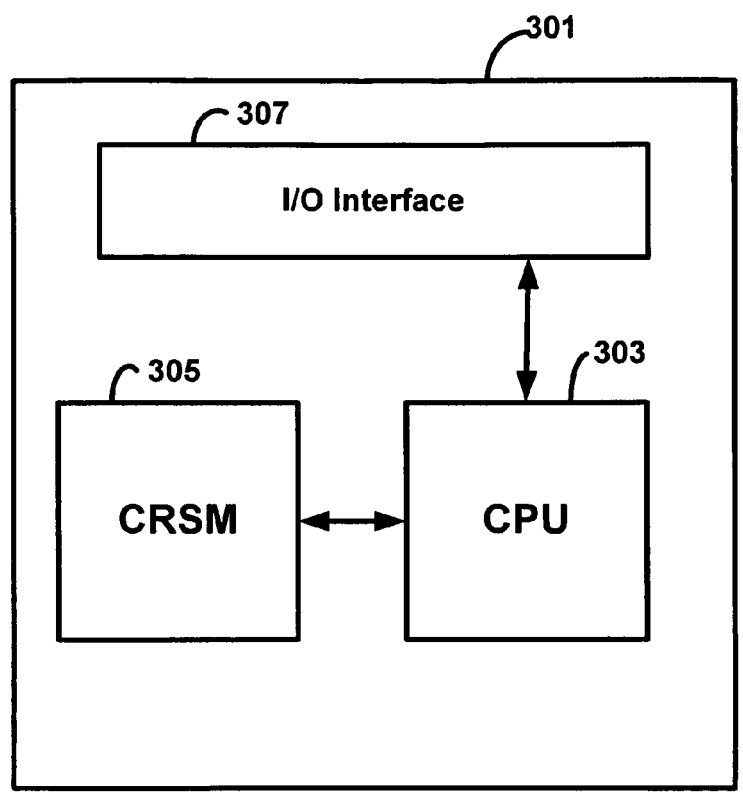
FIG. 3 is a block diagram of an example of an independent node that may be used in the distributed computer system of FIG. 2.

The nodes of computer system 201 may be implemented in any suitable way, as the invention is not limited in this respect. In some embodiments, one or more of the nodes in the distributed system may be implemented as shown in FIG. 3. In FIG. 3, node 301 is an independent computer with its own storage and processing resources. Node 301 comprises a processor 303, a computer-readable storage medium 305, and an input/output interface 307. Computer-readable storage medium 305 may comprise one or more tangible storage media and may store computer-readable instructions that, when executed by processor 303, cause node 301 to perform its portion of the process described above in connection with FIG. 1. Node 301 may send communications to and receive communications from other computers (e.g., other nodes in the distributed system and/or computers outside of the distributed system) via input/output (I/O) interface 307.

Computer readable storage medium 305 may comprise any suitable type of storage medium, such as, for example, a disk drive, an array of disk drives, RAM, and/or any other suitable type of tangible storage medium. Moreover, in some embodiments, some or all of the storage media that comprise computer readable storage medium 305 need not be in the same physical package or box as processor 303. Rather, computer readable storage medium 305 is considered part of the same node as processor 303 because other entities access the data stored on computer readable storage medium 305 through processor 303.

As discussed above, the process shown in FIG. 1 may be used to accomplish many different processing tasks. Some examples of how this process may be used to perform certain distributed processing tasks are described below. However, it should be appreciated that the process shown in FIG. 1 is not limited to use in performing the particular illustrative processing tasks described below. Rather, the process shown in FIG. 1 may be used to perform any number of distributed processing tasks, of which a two examples are provided below.

Content Unit Regeneration

In some embodiments, the process of FIG. 1 may be used to regenerate content units or fragments of content units that have been lost.

For example, a distributed storage system may employ a data protection scheme in which a content unit is divided into multiple fragments and parity information is computed from the fragments. The fragments and the parity information may be stored in a distributed fashion across the nodes, such that not all of the fragments are stored on the same node. If one of the nodes or a storage device on one of the nodes fails and a fragment is lost, the remaining fragments and the parity information may be used to regenerate the lost fragment. The distributed storage system may alternatively or additionally employ a protection scheme in which a content unit is stored in its entirety on a single node, and a mirror copy of the content unit is stored on a different node.

If a node or a storage device within a node fails, it may be desirable to determine which content units or fragments of content units were stored on the failed storage device so that these content units may be regenerated. In some embodiments, the content units or fragments stored on the failed node or storage device may be determined by determining the content units or fragments stored on all of the other storage devices or nodes, and determining which of these content units have fragments missing or do not have mirror copies stored.

This may be accomplished using the process shown in FIG. 1. One node in the distributed system may be designated the central node to coordinate the process of FIG. 1 among the nodes in the distributed system. The central node may divide the entire range of content units in the distributed system into sub-ranges and assign the sub-ranges to nodes in the distributed system.

In some embodiments, if there are n operational nodes in the distributed system, the range of content units may be divided into n sub-ranges. For example, in a distributed system having three operational nodes, content units with identifiers beginning with 'A'-'H' may be assigned to node 1, content units with identifiers beginning with 'I'-'P' may be assigned to node 2, and content units with identifiers beginning with 'Q'-'Z' may be assigned to node 3.

In some embodiments, the central node may be responsible for coordinating the process by instructing nodes when they should perform each act in the process providing any information to the nodes that is useful in performing these acts.

Figure 4:
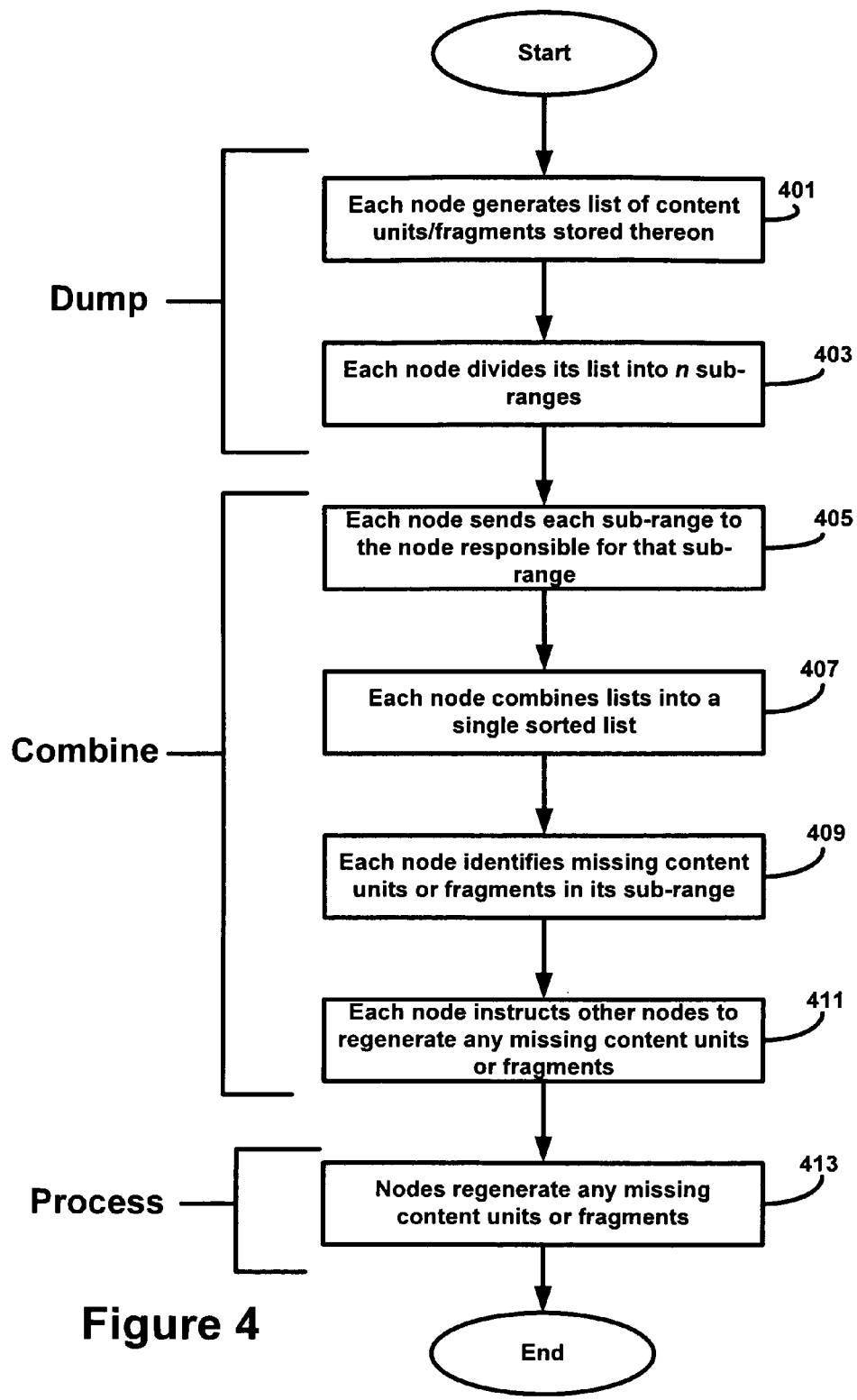
FIG. 4 is a flow chart of an illustrative process for regenerating lost content units in a distributed computer system, in accordance with some embodiments.

Each node in the distributed system may be responsible for determining whether fragments or mirror copies of content units in its assigned range have been lost. FIG. 4 shows an example of a process by which this may be accomplished.

The process of FIG. 4 begins at act 401, which constitutes the beginning of the dump phase of the process. At act 401, each node generates a list of content units or fragments that it stores. This may be done in any suitable way, as the invention is not limited in this respect. For example, in some embodiments, nodes in the distributed computer system may store content units or fragments as files in a file system. A node that stores content units or fragments in this way may generate the list of content units that it stores by requesting the file system to provide a list of all files that it stores.

In some embodiments, each node may sort the list of identifiers that it generates, so that these identifiers are in sorted order in the list. Doing so may facilitate the combining of lists at act 407 (discussed below), and may allow nodes to combine lists using a straightforward merge sort, which uses a relatively small memory footprint.

The process next continues to act 403, which is also part of the dump phase. At act 403, each node divides it list into n sub-ranges, corresponding to the sub-ranges determined by the central node.

The process then continues to act 405. Acts 405-411 constitute the combine phase of the process. At act 405, each node sends each sub-range of its list to the node responsible for that sub-range. For example, in the example described above in which the central node divides the range of content units into three sub-ranges, content units with identifiers beginning with 'A'-'H' may be assigned to node 1, content units with identifiers beginning with 'I'-'P' may be assigned to node 2, and content units with identifiers beginning with 'Q'-'Z' may be assigned to node 3. At act 405, node 1 may send the list of content units that it stores whose identifiers begin with 'I'-'P' to node 2, and may send the list of content units that it stores whose identifiers begin with 'Q'-'Z' to node 3. Because node 1 is assigned the sub-range 'A'-'H', it may store its list of content units whose identifiers begin with 'A'-'H.'

In the example above, each node "pushes" the sub-lists of identifiers to the nodes responsible for those sub-lists. However, the invention is not limited in this respect, as in some embodiments, nodes may pull the sub-lists of identifiers for which they are responsible from other nodes. For example, in the example above, node 1 may send a request to node 2 for the sub-list of identifiers beginning with 'A'-'H' generated by node 2, and node 2 may send this sub-list in response to the request. Similarly, node 1 may send a request to node 3 for the sub-list of identifiers beginning with 'A'-'H' generated by node 3, and node 3 may send this sub-list in response to the request.

The process then continues to act 407 where each node combines the lists received from other nodes with its own list of the sub-range for which it is responsible, and sorts the combined list. For example, in the example above in which content units are divided into three sub-ranges, node 1 may receive a list, from node 2, of content units whose identifiers begin with 'A'-'H' that are stored by node 2 and may receive another list from node 3 of content units whose identifiers begin with 'A'-'H' that are stored by node 3. Node 1 may combine these lists with its own list of content units whose identifiers begin with 'A'-'H' that it stores, and may sort the combined list so that the identifiers in the combined list are in sorted order. Nodes 2 and 3 may each perform the same process for the sub-ranges of content units for which they are responsible.

The sub-lists received by node may be combined in any suitable way. For example, in some embodiments, these sub-lists may be combined using a merge sort, so that the combined list that results from combining the sub-lists is in sorted order.

The process next continues to act 409, where the combined lists created in act 407 are used to determine which content units or fragments have been lost. For example, continuing in the example described above, node 1 may use its combined list to determine which, if any, content units or fragments whose identifiers begin with 'A'-'H' have been lost. This may be done in any suitable way, as the invention is not limited in this respect.

For example, in embodiments in which the data protection scheme employed by the distributed system stores multiple mirror copies on different nodes of the distributed system, a node may use its combined list to determine how many mirrored copies of a content unit are stored in the distributed system and if any additional copies should be generated.

For example, continuing in the example above, if a content unit has the identifier 'ABC', node 1 may determine how many times this identifier appears in the combined list that it generated in act 407. If the identifier appears only one time, but the data protection scheme of the storage system specifies that two copies of the content unit should be stored, node 1 may determine that an additional copy of the content unit should be generated and stored.

In embodiments in which the data protection scheme employed by the distributed system divides a content unit into fragments and generates parity information for those fragments, a node may use its combined list to determine if any fragments have been lost or if the parity information for those fragments has been lost. This may be done in any suitable way, as the invention is not limited in this respect.

For example, in some embodiments, a content unit may be divided into six data fragments and one parity fragment. If the identifier for the content unit as a whole (i.e., the identifier used by accessing entities to access the content unit on the distributed system) is 'ABC', then each fragment may be assigned an identifier that includes the identifier for the content unit as a whole, but also identifies which fragment it is. Thus, for example, the fragments for the content unit 'ABC,' may be assigned identifiers ABC.1, ABC.2, ABC.3, ABC.4, ABC.5, ABC.6, and ABC.7. A node may use the combined list to determine whether a fragment of a content unit is missing by determining if any of the fragment identifiers for the content unit do not appear in the combined list.

In the example above, the data protection scheme described uses seven fragments (i.e., six data fragments and one parity fragment) to protect a content unit. However, the invention is not limited in this respect as other fragmentation schemes may be used.

Once the nodes, in act 409, have identified any missing content units or fragments, the process continues to act 411, where each node determines which other nodes are responsible for regenerating the content units or fragments that it has determined, at act 409, to be missing, and sends instructions to those nodes to regenerate the missing content units or fragment. In situations where a node determines that it is responsible for regenerating a content unit or fragment that it has determined to be missing, the node need not send an instruction to itself (though it may), but rather may proceed to act 413.

A node may determine which node is responsible for regenerating a missing content unit or fragment in any suitable way, as the invention is not limited in this respect.

In some embodiments, the central node may define an algorithm that may be used by each node to determine which node is responsible for regenerating a particular content unit or fragment based on the identifier of the content unit or fragment. Any suitable algorithm may be used, as the invention is not limited in this respect. In some embodiments, the algorithm may be defined to attempt to distribute the processing load of regenerating content units or fragments evenly amongst the operational nodes in the distributed system.

The instruction from one node to another to regenerate a content unit or fragment may be sent in any suitable way and may include any suitable information. For example, in some embodiments, the instruction from one node to another may identify the content unit or fragment to be regenerated by specifying the identifier for the content unit or fragment.

In the example above, nodes initiate communications that instruct other nodes to perform processing on particular content units. However, the invention is not limited in this respect as in some embodiments, nodes responsible for processing content units may send communications to one or more other nodes to request the content units that it is responsible for processing, and these content units may be sent in response to the request. This may be done in any suitable way, as the invention is not limited in this respect.

For example, in some embodiments, a processing node may determine, either by convention or by information received from the central node, which node or nodes it should contact to request content units for processing and how to request content units from that node(s).

In some embodiments, the central node may coordinate this process, such that each node requests the content units for which it is responsible for processing only when the other nodes in the system that are participating in the process have completed identifying content units that warrant processing (e.g., in act 409).

After act 411, the process continues to act 413, which is the beginning of the process phase. At act 413, each node regenerates the content units or fragments that it is responsible for regenerating. This may be done in any suitable way, as the invention is not limited in this respect.

For example, in embodiments in which the data protection scheme employed by the distributed system stores multiple mirror copies, when a node receives an instruction to regenerate an additional copy of a content unit, it may send a request for the content unit identified in the instruction to the distributed system in the content unit that stores the remaining copy of the content unit, create an additional copy of the content unit and store it on one of its internal storage devices or on another node.

In embodiments in which the data protection scheme employed by the distributed system divides a content unit into fragments and generates parity information for those fragments, when a node receives an instruction to regenerate a missing fragment, it may request the remaining fragments from the nodes in the storage system that store those fragments, use the remaining fragments to regenerate the missing fragment, and store the regenerated fragment on one of its internal storage devices or on another node.

After act 413 is completed, the process ends. As can be appreciated from the foregoing, the process shown in FIG. 4 enables the distributed system to determine if any content units or fragments of content units have been lost and to regenerate any lost content units or fragments. The processing load of determining which content units or fragments, if any, have been lost and regenerating any lost content units or fragments is distributed across the nodes of the distributed computer system, so that no single node has to bear the entire load by itself.

De-Duplication

Applicants have appreciated that the process shown in FIG. 1 may be used, in some embodiments, to identify content units for which unneeded duplicates exist and to remove the unneeded duplicates from the distributed computer system.

Unneeded duplicates may exist on a distributed computer system for a number of reasons. For example, if a node or a storage device within a node fails, content units stored on the failed node or storage device may be regenerated. If the failed node or storage device later comes back on line, additional and unneeded copies of the content units that were regenerated in response to the failure may exist. It may be desirable to delete these unneeded content units to free up storage space in the distributed system.

In addition, the distributed computer system may receive a request to store a content unit. Upon receipt of such a request, it may be desirable to identify whether the distributed computer system already stores a content unit having the same content, so that a new copy of the content unit need not be kept on the storage system if a copy of it already exists. Alternatively, rather than determining whether the a copy of the content unit is already stored upon receipt of a request, the computer system may store the content unit in response to the request, and periodically run a check to identify and delete unneeded duplicates.

Figure 5:
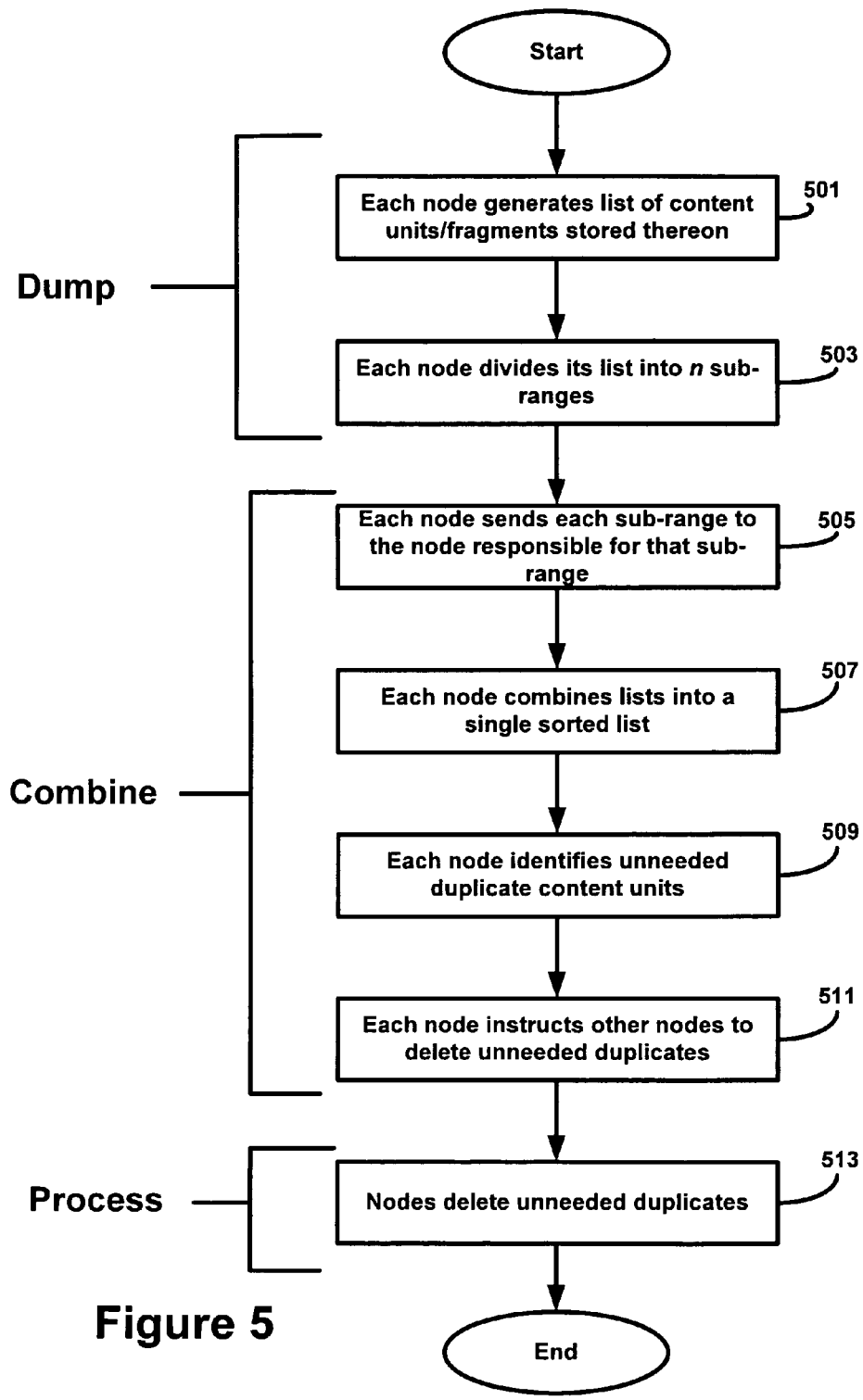
FIG. 5 is a flow chart of an illustrative process for identifying and deleting unneeded duplicate content units in a distributed computer system, in accordance with some embodiments.

FIG. 5 shows an illustrative process that implements the process of FIG. 1 to identify whether unneeded duplicates of content units exist on the distributed system and to remove the unneeded duplicates.

Similar to the example described above in connection FIG. 4, one node in the distributed system may be designated the central node to coordinate the process. The central node may divide the entire range of content units in the distributed system into sub-ranges and assign the sub-ranges to nodes in the distributed system. Any suitable division of the range into sub-ranges may be used and these sub-ranges may be assigned to nodes in any suitable way, as the invention is not limited in these respects.

In some embodiments, the central node may be responsible for coordinating the process by instructing nodes when they should perform each act in the process providing any information to the nodes that is useful in performing these acts.

The process of FIG. 5 begins at act 501, which is the beginning of the dump phase of the process. At act 501, each node generates a list of content units that it stores. As discussed above in connection with FIG. 4, this may be done in any suitable way, as the invention is not limited in this respect. For example, in some embodiments, nodes in the distributed computer system may store content units or fragments as files in a file system. A node that stores content units or fragments in this way may generate the list by requesting the file system to provide a list of all files that it stores.

In some embodiments, each node may sort the list of identifiers that it generates, so that these identifiers are in sorted order in the list. Doing so may facilitate the combining of sub-lists at act 507 (discussed below), and may allow nodes to combine lists using a straightforward merge sort, which uses a relatively small memory footprint.

The process next continues to act 503. At act 503, each node divides it list into n sub-ranges, corresponding to the sub-ranges determined and assigned by the central node.

The process then continues to act 505. Acts 505-511 constitute the combine phase of the process. At act 505, each node sends each sub-range of its list to the node responsible for that sub-range. This may be done in any suitable way, as the invention is not limited in this respect. For example, act 505 may be performed in a manner similar to act 405 of FIG. 4.

After act 505, the process continues to act 507, where each node combines the lists received from other nodes with its own list of the sub-range for which it is responsible, and sorts the combined list.

The sub-lists received by node may be combined in any suitable way. For example, in some embodiments, these sub-lists may be combined using a merge sort, so that the combined list that results from combining the sub-lists is in sorted order.

The process next continues to act 509, where the combined lists created in act 507 are used to identify unneeded duplicates of content units. This may be done in any suitable way, as the invention is not limited in this respect. For example, a node may use its combined list to determine how many copies of a content unit are stored in the distributed content system. If more copies are stored than should be stored, the node may determine that one or more copies of the content unit should be deleted. Thus, for example, if the distributed storage system employs a data protection scheme in which two copies of a content unit are stored on different nodes, and a node determines, at act 509, that three copies of the content unit are stored in the distributed storage system, the node may determine that one copy of the content unit should be deleted.

After act 509, the process continues to act 511, where each node determines which other nodes are responsible for deleting the unneeded copies of content units identified in act 509. This may be done in any suitable way, as the invention is not limited in this respect.

For example, in some embodiments, when a node generates its combined list in act 507, the node may include in the combined list information that identifies which node stores each content unit whose identifier is in the combined list. When, at act 509, the node identifies a content unit for deletion, it can determine from the combined list which nodes store a copy of that content unit and may select one of these nodes to delete its copy of the content unit.

The node may select a node that is to delete its copy of the content unit to be deleted in any suitable way, as the invention is not limited in this respect. In some embodiments, the central node may define an algorithm that may be used by each node to determine which of a plurality of nodes that stores a copy of a content unit should be selected to delete its copy. Any suitable algorithm may be used, as the invention is not limited in this respect. In some embodiments, the algorithm may be defined to attempt to distribute the processing load of deleting content units evenly amongst the operational nodes in the distributed system.

Once a node identifies a content unit for which an unneeded copy should be deleted and selects a node to delete its copy of the content, the node may send an instruction to the selected node to its copy of the content unit. The instruction may be sent in any suitable way and may include any suitable information. For example, in some embodiments, the instruction may include information that instructs the selected node to delete a content unit and that identifies the content unit to be deleted using its identifier.

In the example above, nodes initiate communications that instruct other nodes to perform processing on particular content units. However, the invention is not limited in this respect as in some embodiments, nodes responsible for processing content units may send communications to one or more other nodes to request the content units that it is responsible for processing, and these content units may be sent in response to the request. This may be done in any suitable way, as the invention is not limited in this respect.

For example, in some embodiments, a processing node may determine, either by convention or by information received from the central node, which node or nodes it should contact to request content units for processing and how to request content units from that node(s).

In some embodiments, the central node may coordinate this process, such that each node requests the content units for which it is responsible for processing only when the other nodes in the system that are participating in the process have completed identifying content units that warrant processing (e.g., in act 509).

After act 511, the process continues to act 513, which is the beginning of the processing phase. At act 513, each node deletes the content units that it has been instructed to delete, and the process ends. As can be appreciated from the foregoing, the process shown in FIG. 5 enables the distributed system to determine if any unneeded duplicate content units are stored in the distributed system and to delete these unneeded duplicates. The processing load for performing these tasks is distributed across the nodes of the distributed computer system, so that no single node has to bear the entire load by itself.

In the examples described above in connection with FIGS. 4 and 5, the process of FIG. 1 is implemented as a single process that is performed for all content units stored in the distributed system. Applicants have appreciated that when a large number of content units are stored in the distributed system, performing the process for all content units at once may place a great processing burden on the system. In some cases where the number of content units stored in the distributed system is very large, the processing burden may be so great as to render the system unable to process access requests from client computers in a timely fashion.

Thus, in some embodiments, the processes of FIGS. 1, 4, and 5 may be performed incrementally. For example, in some embodiments, these processes may first be performed for a portion of the content units in the distributed system, and then repeated for another portion of the content units in the distributed system, and repeated until all content units in the distributed system have been processed.

In the examples described above in connection with FIGS. 4 and 5, identifiers for content units are used to create lists of content units that are stored on each node, to access content units, and to identify to nodes that are responsible for processing content units which content units warrant processing. Any suitable type of identifiers may be used. In embodiments in which the distributed computer system is an OAS system, these identifiers may be object identifiers that, from the perspective of client computers accessing the OAS system, are independent of any physical and/or logical storage location of the content units that they identify.

In some embodiments, the OAS system may be a CAS system, and these identifiers may be content addresses that are generated, at least in part, from at least a portion of the content of the content units that they identify.

The above-described embodiments of the present invention can be implemented in any of numerous ways. For example, the embodiments may be implemented using hardware, software or a combination thereof. When implemented in software, the software code can be executed on any suitable hardware processor or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing content units in a distributed computer system comprising a plurality of nodes coupled by at least one communication medium, wherein each of the plurality of nodes comprises at least one independent computer that has hardware processing and storage resources separate from those of any other of the plurality of nodes, wherein each of the independent nodes stores a plurality of content units, wherein the plurality of nodes comprises at least a first node and a second node, and wherein the method comprises acts of:
   (A) generating, on each of the first and second nodes, a list of identifiers of content units stored on that node;
   (B) dividing each of the lists generated in the act (A) into a plurality of sub-lists, wherein each sub-list includes a particular range of identifiers assigned to a node of the distributed computer system;
   (C) sending, from the first node to the second node, the sub-list generated in the act (B) that includes the range of identifiers that is assigned to the second node and sending, from the second node to the first node, the sub-list generated in the act (B) that includes the range of identifiers that is assigned to the first node;
   (D) receiving, at the first node, the sub-list from the second node and combining the sub-list from the second node with at least one other sub-list generated in the act (B) to generate a first combined list, and receiving, at the second node, the sub-list from the first node and combining the sub-list from the first node with at least one other sub-list generated in the act (B) to generate a second combined list different from the first combined list;
   (E) identifying, at the first node, whether any content units identified in the first combined list warrant processing and identifying, at the second node, whether any content units identified in the second combined list warrant processing; and
   (F) when it is determined in the act (E) that at least one content unit identified in the first combined list warrants processing:
      (F1) selecting at least one of the plurality of nodes to perform the processing for the at least one content unit identified as warranting processing; and
      (F2) sending at least one instruction, from the first node to the at least one of the plurality of nodes selected in the act (F1), to process the at least one content unit identified in the act (E) as warranting processing.

2. The method of claim 1, wherein first and second nodes each store the plurality of content units stored thereon in files in a file system and wherein the act of generating, on each of the first and second nodes, a list of identifiers of content units stored on the node comprises an act of sending, on each of the first and second nodes node, a request to the file system on that node to list the files stored in the file system.

3. The method of claim 1, wherein the distributed computer system is an object addressable storage (OAS) system, and wherein each identifier in each of the lists of identifiers generated in the act (A) is an object address that is independent of any physical and logical storage location of its corresponding content unit in the distributed system.

4. The method of claim 3, wherein the OAS system is a content addressable storage (CAS) system, and wherein each identifier in each of the lists of identifiers is a content address that is generated, at least in part, from at least a portion of the content of its corresponding content unit.

5. The method of claim 1, wherein the act (E) further comprises an act identifying, at the first node, whether any content units identified in the first combined list warrant regeneration and identifying, at the second node, whether any content units identified in the second combined list warrant regeneration.

6. The method of claim 5, wherein the act (F1) further comprises an act of selecting at least one of the plurality of nodes to perform the regeneration for the at least one content unit identified as warranting regeneration, and wherein the act (F2) further comprises an act of sending at least one instruction, from the first node to the at least one of the plurality of nodes selected in the act (F1), to regenerate the at least one content unit identified in the act (E) as warranting regeneration.

7. The method of claim 1, wherein the act (E) further comprises an act of identifying, at the first node, whether any content units identified in the first combined list warrant deletion and identifying, at the second node, whether any content units identified in the second combined list warrant deletion.

8. At least one non-transitory computer readable storage medium encoded with instructions that, when executed, perform a method of processing content units in a distributed computer system comprising a plurality of nodes coupled by at least one communication medium, wherein each of the plurality of nodes comprises at least one independent computer that has hardware processing and storage resources separate from those of any other of the plurality of nodes, wherein each of the independent nodes stores a plurality of content units, wherein the plurality of nodes comprises at least a first node and a second node, and wherein the method comprises acts of:
(A) generating, on each of the first and second nodes, a list of identifiers of content units stored on that node;
(B) dividing each of the lists generated in the act (A) into a plurality of sub-lists, wherein each sub-list includes a particular range of identifiers assigned to a node of the distributed computer system;
(C) sending, from the first node to the second node, the sub-list generated in the act (B) that includes the range of identifiers that is assigned to the second node and sending, from the second node to the first node, the sub-list generated in the act (B) that includes the range of identifiers that is assigned to the first node;
(D) receiving, at the first node, the sub-list from the second node and combining the sub-list from the second node with at least one other sub-list generated in the act (B) to generate a first combined list, and receiving, at the second node, the sub-list from the first node and combining the sub-list from the first node with at least one other sub-list generated in the act (B) to generate a second combined list different from the first combined list;
(E) identifying, at the first node, whether any content units identified in the first combined list warrant processing and identifying, at the second node, whether any content units identified in the second combined list warrant processing; and
(F) when it is determined in the act (E) that at least one content unit identified in the first combined list warrants processing:
(F1) selecting at least one of the plurality of nodes to perform the processing for the at least one content unit identified as warranting processing; and
(F2) sending at least one instruction, from the first node to the at least one of the plurality of nodes selected in the act (F1), to process the at least one content unit identified in the act (E) as warranting processing.

9. The at least one non-transitory computer readable storage medium of claim 8, wherein first and second nodes each store the plurality of content units stored thereon in files in a file system and wherein the act of generating, on the first and second nodes, a list of identifiers of content units stored on the node comprises an act of sending, on each of the first and second nodes node, a request to the file system on that node to list the files stored in the file system.

10. The at least one non-transitory computer readable storage medium of claim 8, wherein the distributed computer system is an object addressable storage (OAS) system, and wherein each identifier in each of the lists of identifiers generated in the act (A) is an object address that is independent of any physical and logical storage location of its corresponding content unit in the distributed system.

11. The at least one non-transitory computer readable storage medium of claim 10, wherein the OAS system is a content addressable storage (CAS) system, and wherein each identifier in each of the lists of identifiers is a content address that is generated, at least in part, from at least a portion of the content of its corresponding content unit.

12. The at least one non-transitory computer readable storage medium of claim 8, wherein the act (E) further comprises an act identifying, at the first node, whether any content units identified in the first combined list warrant regeneration and identifying, at the second node, whether any content units identified in the second combined list warrant regeneration.

13. The at least one non-transitory computer readable storage medium of claim 12, wherein the act (F1) further comprises an act of selecting at least one of the plurality of nodes to perform the regeneration for the at least one content unit identified as warranting regeneration, and wherein the act (F2) further comprises an act of sending at least one instruction, from the first node to the at least one of the plurality of nodes selected in the act (F1), to regenerate the at least one content unit identified in the act (E) as warranting regeneration.

14. The at least one non-transitory computer readable storage medium of claim 8, wherein the act (E) further comprises an act of identifying, at the first node, whether any content units identified in the first combined list warrant deletion and identifying, at the second node, whether any content units identified in the second combined list warrant deletion.

15. A distributed computer system comprising:
a plurality of nodes coupled by at least one communication medium, wherein each of the plurality of nodes is an independent computer having separate hardware processing and storage resources, wherein each of the independent nodes stores a plurality of content units, wherein each of the plurality of nodes is assigned a range of identifiers of content units, wherein each of the range of identifiers is different from one another, and wherein at least one of the plurality of nodes comprises at least one controller that:

generates a list of identifiers of content units stored on the node;

divides the list of identifiers into a plurality of sub-lists, wherein each sub-list includes identifiers within the respective range of identifiers assigned to a respective node of the plurality of nodes;

sends at least some of the sub-lists to other nodes of the plurality of nodes in the distributed computer system, wherein each of the other nodes is sent a sub-list comprising identifiers within the respective range of identifiers assigned to the other node;

receives at least one sub-list from at least one other node and combines the at least one sub-list from the at least one other node with a sub-list of the plurality of sub-lists comprising identifiers within the range of identifiers assigned to the at least one of the plurality of nodes to generate a combined list;

identifies whether any content units identified in the combined list warrant processing;

selects at least one node of the plurality of nodes to perform the processing for each of the content units identified as warranting processing; and sends at least one instruction to each of the at least one selected node to process the content units selected to be processed by that node.

16. The distributed computer system of claim 15, wherein each of the nodes stores the plurality of content units stored thereon in files in a file system and wherein the at least one controller generates the list of identifiers by sending a request to the file system to list the files stored in the file system on the at least one of the plurality of nodes.

17. The distributed computer system of claim 15, wherein the distributed computer system is an object addressable storage (OAS) system, and wherein each identifier in the list of identifiers is independent of any physical and logical storage location of its corresponding content unit in the distributed system.

18. The distributed computer system of claim 17, wherein the OAS system is a content addressable storage (CAS) system, and wherein each identifier the list of identifiers is a content address that is generated, at least in part, from at least a portion of the content of its corresponding content unit.

19. The distributed computer system of claim 15, wherein the at least one controller identifies whether any content units identified in the combined list warrant regeneration.

20. The distributed computer system of claim 15, wherein the at least one controller identifies whether any content units identified in the combined list warrant deletion.

* * * * *